United States Patent
Li et al.

(10) Patent No.: US 11,395,100 B2
(45) Date of Patent: Jul. 19, 2022

(54) INDOOR POSITIONING METHOD, INDOOR POSITIONING SYSTEM, INDOOR POSITIONING APPARATUS AND COMPUTER READABLE MEDIUM

(71) Applicant: BOE TECHNOLOGY GROUP CO., LTD., Beijing (CN)

(72) Inventors: Yue Li, Beijing (CN); Tong Liu, Beijing (CN); Jingtao Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 364 days.

(21) Appl. No.: 16/488,341

(22) PCT Filed: Jan. 2, 2019

(86) PCT No.: PCT/CN2019/070093
§ 371 (c)(1),
(2) Date: Aug. 23, 2019

(87) PCT Pub. No.: WO2019/184542
PCT Pub. Date: Oct. 3, 2019

(65) Prior Publication Data
US 2021/0360368 A1 Nov. 18, 2021

(30) Foreign Application Priority Data
Mar. 26, 2018 (CN) .......................... 201810253021.2

(51) Int. Cl.
*H04W 4/33* (2018.01)
*H04W 4/029* (2018.01)
(Continued)

(52) U.S. Cl.
CPC .............. *H04W 4/029* (2018.02); *G06T 7/74* (2017.01); *G06V 10/751* (2022.01); *H04W 4/33* (2018.02)

(58) Field of Classification Search
CPC ...... H04W 4/029; H04W 4/33; G06K 9/6202; G06T 7/74
See application file for complete search history.

(56) References Cited

U.S. PATENT DOCUMENTS

2010/0010741 A1 1/2010 Tener et al.
2010/0046636 A1* 2/2010 Hatabu .................. H04N 19/51
375/E7.027

(Continued)

FOREIGN PATENT DOCUMENTS

| CN | 102435172 A | 5/2012 |
|----|-------------|--------|
| CN | 104819723 A | 8/2015 |

(Continued)

OTHER PUBLICATIONS

First Office Action dated Oct. 9, 2020 for application No. CN201810253021.2 with English translation attached.

(Continued)

*Primary Examiner* — Chuong A Ngo
(74) *Attorney, Agent, or Firm* — Nath, Goldberg & Meyer; Joshua B. Goldberg

(57) ABSTRACT

The present disclosure discloses an indoor positioning method, an indoor positioning system, an indoor positioning apparatus and a computer readable medium. The indoor positioning method includes: determining an initial position of a target object using combination of wireless positioning and visual feature map matching positioning; and according to the initial position of the target object, performing real-time positioning on the target object using combination of short-time interframe feature matching positioning and the visual feature map matching positioning.

18 Claims, 4 Drawing Sheets

(51) Int. Cl.
    *G06T 7/73*    (2017.01)
    *G06V 10/75*   (2022.01)

(56) References Cited

U.S. PATENT DOCUMENTS

2011/0156957 A1* 6/2011 Waite .................. G01S 5/0252
                                                      342/450
2015/0213572 A1   7/2015 Loss
2017/0311127 A1* 10/2017 Murphy ............... H04W 4/026

FOREIGN PATENT DOCUMENTS

| CN | 104936283 A | 9/2015 |
| CN | 105188135 A | 12/2015 |
| CN | 105246039 A | 1/2016 |
| CN | 105371847 A | 3/2016 |
| CN | 106470478 A | 3/2017 |
| CN | 106793086 A | 5/2017 |
| CN | 107246868 A | 10/2017 |
| CN | 107356252 A | 11/2017 |
| CN | 107478214 A | 12/2017 |
| CN | 107677279 A | 2/2018 |
| WO | 2012/024516 A2 | 2/2012 |

OTHER PUBLICATIONS

Search Report dated Dec. 2, 2021 issued in corresponding European Application No. 19755264.9.

* cited by examiner

INDOOR POSITIONING METHOD, INDOOR POSITIONING SYSTEM, INDOOR POSITIONING APPARATUS AND COMPUTER READABLE MEDIUM

CROSS-REFERENCE TO RELATED APPLICATIONS

This is a National Phase Application filed under 35 U.S.C. 371 as a national stage of PCT/CN2019/070093, filed Jan. 2, 2019, an application claiming the priority of Chinese Patent Application No. 201810253021.2, filed on Mar. 26, 2018, the contents of each of which are incorporated herein in their entirety by reference.

TECHNICAL FIELD

The present disclosure relates to the field of indoor positioning technology, and in particular, relates to an indoor positioning method, an indoor positioning system, an indoor positioning apparatus and a computer readable medium.

BACKGROUND

As the rapid increase of data service and multimedia service, people's demand for positioning and navigation is growing with each passing day, particularly in a complex indoor environment, such as a building, an airport lobby, an exhibition hall, a supermarket, a library, an underground parking lot and so on, it is often necessary to determine indoor positional information of a mobile terminal or its holder, facilities and objects. Therefore visual positioning technique and wireless positioning technique have arisen.

SUMMARY

The technical problem to be addressed in the present disclosure lies in that, with regard to the above-described deficiency in the prior art, there are provided an indoor positioning method, an indoor positioning system, an indoor positioning apparatus and a computer readable medium.

In a first aspect, an embodiment of the present disclosure provides an indoor positioning method, including steps of: determining an initial position of a target object using combination of wireless positioning and visual feature map matching positioning; and according to the initial position of the target object, performing real-time positioning on the target object using combination of short-time interframe feature matching positioning and the visual feature map matching positioning.

In an embodiment of the present disclosure, the step of determining the initial position of the target object using combination of wireless positioning and visual feature map matching positioning includes steps of: determining a first position coordinate of the target object using wireless positioning method; screening a first to-be-matched key frame group in a visual feature map using the first position coordinate, to acquire a second to-be-matched key frame group; and computing the initial position of the target object using the second to-be-matched key frame group, wherein, the first to-be-matched key frame group is obtained by: acquiring the visual feature map and visual words of a current frame of an image of the target object; and searching the visual feature map, to find out all key frames which have a common visual word with the current frame of the image of the target object and are not connected to the current frame.

In an embodiment of the present disclosure, the step of, according to the initial position of the target object, performing real-time positioning on the target object using combination of short-time interframe feature matching positioning and the visual feature map matching positioning, includes steps of: performing real-time positioning on the target object by employing short-time interframe feature matching positioning to obtain a first positioning result; every predetermined time, performing visual feature map matching positioning on the target object, and obtaining a second positioning result according to the initial position; and correcting the first positioning result using the second positioning result.

In an embodiment of the present disclosure, the step of screening the first to-be-matched key frame group in the visual feature map using the first position coordinate, to acquire the second to-be-matched key frame group includes steps of: determining whether a to-be-matched key frame in the first to-be-matched key frame group satisfies the following relationships:

$$x_a - \Delta d \leq x_i \leq x_a + \Delta d$$

$$y_a - \Delta d \leq y_i \leq y_a + \Delta d$$

where, $(x_i, y_i, z_i)$ is a position coordinate of an i-th to-be-matched key frame in the first to-be-matched key frame group, $(x_a, y_a)$ is the first position coordinate of the target object, $\Delta d$ is a maximum position error of wireless positioning; in a case where the relationships are satisfied, the to-be-matched key frame is retained; in a case where the relationships are not satisfied, the to-be-matched key frame is discarded; a set of retained to-be-matched key frames is the second to-be-matched key frame group.

In an embodiment of the present disclosure, the step of computing the initial position of the target object using the second to-be-matched key frame group includes steps of: acquiring the current frame of the image of the target object and determining visual words of the current frame; according to at least one of a number of same visual words and a visual word matching degree of each to-be-matched key frame in the second to-be-matched key frame group compared with the current frame, giving a score to each to-be-matched key frame in the second to-be-matched key frame group; computing the initial position of the target object, according to a to-be-matched key frame having a highest score and the current frame of the image of the target object.

In an embodiment of the present disclosure, the step of, every predetermined time, performing visual feature map matching positioning on the target object, and obtaining the second positioning result according to the initial position, includes steps of: screening a third to-be-matched key frame group in a visual feature map using the first positioning result, to acquire a fourth to-be-matched key frame group; and computing the second positioning result of the target object using the fourth to-be-matched key frame group and according to the initial position, wherein, the third to-be-matched key frame group is obtained by: acquiring the visual feature map and visual words of a current frame of an image of the target object; and searching the visual feature map, to find out all key frames which have a common visual word with the current frame of the image of the target object and are not connected to the current frame.

In an embodiment of the present disclosure, the step of screening the third to-be-matched key frame group in the visual feature map using the first positioning result, to acquire the fourth to-be-matched key frame group, includes steps of: determining whether a to-be-matched key frame in the third to-be-matched key frame group satisfies the following relationships:

$$x_b - \delta \leq x_j \leq x_b + \delta$$

$$y_b - \delta \leq y_j \leq y_b + \delta$$

where, $(x_j, y_j, z_j)$ is a position coordinate of a j-th to-be-matched key frame in the third to-be-matched key frame group, a coordinate of the first positioning result is $(x_b, y_b)$, $\delta$ is an accumulative error threshold of interframe feature matching positioning within the predetermined time; in a case where the relationships are satisfied, the to-be-matched key frame is retained; in a case where the relationships are not satisfied, the to-be-matched key frame is discarded; a set of retained to-be-matched key frames is the fourth to-be-matched key frame group.

In an embodiment of the present disclosure, the step of computing the second positioning result of the target object using the fourth to-be-matched key frame group and according to the initial position includes steps of: acquiring the current frame of the image of the target object and determining visual words of the current frame; according to at least one of a number of same visual words and a visual word matching degree of each to-be-matched key frame in the fourth to-be-matched key frame group compared with the current frame, giving a score to each to-be-matched key frame in the fourth to-be-matched key frame group; according to a to-be-matched key frame having a highest score and the current frame of the image of the target object, computing a coordinate transformation matrix of the current frame relative to the initial position; computing the second positioning result of the target object according to the coordinate transformation matrix.

In an embodiment of the present disclosure, the step of correcting the first positioning result using the second positioning result includes step of: obtaining a corrected first positioning result by using extended Kalman filter algorithm to perform data fusion on the first positioning result and the second positioning result, wherein, the first positioning result is treated as a state priori estimator, the second positioning result is treated as a state observation value.

In an embodiment of the present disclosure, the indoor positioning method further includes: constructing a visual feature map of an indoor environment where the target object is located.

In another aspect, an embodiment of the present disclosure provides an indoor positioning system, including: a positioning initialization device, configured to determine an initial position of a target object using combination of wireless positioning and visual feature map matching positioning; and an online positioning device, configured to perform, according to the initial position of the target object, real-time positioning on the target object using combination of short-time interframe feature matching positioning and the visual feature map matching positioning.

In an embodiment of the present disclosure, the positioning initialization device includes: a first positioning circuit, configured to determine a first position coordinate of the target object using wireless positioning technique; and a second positioning circuit, configured to: screen a first to-be-matched key frame group in a visual feature map using the first position coordinate, to acquire a second to-be-matched key frame group; and compute the initial position of the target object using the second to-be-matched key frame group, wherein, the first to-be-matched key frame group is obtained by: acquiring the visual feature map and visual words of a current frame of an image of the target object; and searching the visual feature map, to find out all key frames which have a common visual word with the current frame of the image of the target object and are not connected to the current frame.

In an embodiment of the present disclosure, the online positioning device includes: a third positioning circuit, configured to perform real-time positioning on the target object by employing short-time interframe feature matching positioning, and obtain a first positioning result; and a fourth positioning circuit, configured to perform, every predetermined time, visual feature map matching positioning on the target object, and obtain a second positioning result according to the initial position, and correct the first positioning result using the second positioning result.

In an embodiment of the present disclosure, the second positioning circuit includes: a first screening sub-circuit, configured to determine whether an i-th to-be-matched key frame in the first to-be-matched key frame group satisfies the following relationships:

$$x_a - \Delta d \leq x_i \leq x_a + \Delta d$$

$$y_a - \Delta d \leq y_i \leq y_a + \Delta d$$

where, $(x_i, y_i, z_i)$ is a position coordinate of the i-th to-be-matched key frame in the first to-be-matched key frame group, $(x_a, y_a)$ is the first position coordinate of the target object, $\Delta d$ is a maximum position error of wireless positioning; in a case where the relationships are satisfied, the to-be-matched key frame is retained; in a case where the relationships are not satisfied, the to-be-matched key frame is discarded; a set of retained to-be-matched key frames is the second to-be-matched key frame group; and a first computing sub-circuit, configured to compute the initial position of the target object using the second to-be-matched key frame group.

In an embodiment of the present disclosure, the fourth positioning circuit includes: a positioning sub-circuit, configured to: screen a third to-be-matched key frame group in a visual feature map using the first positioning result, to acquire a fourth to-be-matched key frame group; and compute the second positioning result of the target object using the fourth to-be-matched key frame group and according to the initial position; a timing sub-circuit, configured to trigger, every predetermined time, operation of the positioning sub-circuit; and a correcting sub-circuit, configured to correct the first positioning result using the second positioning result, wherein, the third to-be-matched key frame group is obtained by: acquiring the visual feature map and visual words of a current frame of an image of the target object; and searching the visual feature map, to find out all key frames which have a common visual word with the current frame of the image of the target object and are not connected to the current frame.

In an embodiment of the present disclosure, the positioning sub-circuit includes: a second screening sub-circuit, configured to determine whether a to-be-matched key frame in the third to-be-matched key frame group satisfies the following relationships:

$$x_b - \delta \leq x_j \leq x_b + \delta$$

$$y_b - \delta \leq y_j \leq y_b + \delta$$

wherein, $(x_j, y_j, z_j)$ is a position coordinate of a to-be-matched key frame in the third to-be-matched key frame group, a coordinate of the first positioning result is $(x_b, y_b)$, $\delta$ is an accumulative error threshold of interframe feature matching positioning within the predetermined time; in a case where the relationships are satisfied, the to-be-matched key frame is retained; in a case where the relationships are not satisfied, the to-be-matched key frame is discarded; a set of retained to-be-matched key frames is the fourth to-be-matched key frame group; and a second computing sub-circuit, configured to compute the second positioning result of the target object using the fourth to-be-matched key frame group and according to the initial position.

In an embodiment of the present disclosure, the correcting sub-circuit is configured to obtain a corrected first positioning result by performing, using extended Kalman filter algorithm, data fusion on the first positioning result and the second positioning result, wherein, the first positioning result is treated as a state priori estimator, the second positioning result is treated as a state observation value.

In yet another aspect, an embodiment of the present disclosure provides an indoor positioning apparatus, including: one or more processors; and one or more memories, wherein, the one or more memories store computer executable instructions, the computer executable instructions, when run by the one or more processors, perform the indoor positioning method.

In yet another aspect, an embodiment of the present disclosure provides a computer readable medium, stored with computer executable instructions, wherein the computer executable instructions, when run by a processor, perform the indoor positioning method.

BRIEF DESCRIPTION OF TIRE DRAWINGS

DETAILED DESCRIPTION

In order to allow those skilled in the art to better understand technical solutions of the present disclosure, and to further clarify the purpose, technical solutions and advantages of the present disclosure, the present disclosure is described in further detail below in conjunction with the accompanying drawings and specific implementations.

As the rapid increase of data service and multimedia service, people's demand for positioning and navigation is growing with each passing day, particularly in a complex indoor environment, such as a building, an airport lobby, an exhibition hall, a supermarket, a library, an underground parking lot and so on, it is often necessary to determine indoor positional information of a mobile terminal or its holder, facilities and articles. Therefore visual positioning technique and wireless positioning technique have arisen. A method based on wireless positioning, such as Bluetooth positioning, RFID positioning, WiFi positioning and the like, has small amount of computation, and real-time positioning is achievable simply at a mobile phone or tablet terminal carried by a user, but the positioning accuracy is not high, susceptible to interference from environment. A positioning method based on vision has a high positioning accuracy, but performs positioning generally in the form of matching with visual feature map search, and the visual feature map has a huge amount of data, which is not operable on an electronic device carried by a user; moreover, in the positioning method using visors, when there is high similarity in surrounding environment (for example, two rooms with similar decoration styles), a positioning error may occur. How to reduce the amount of computation in positioning, while avoiding positioning errors under high similarity environment, has become today's pressing technical problem to be solved.

Figure 1:
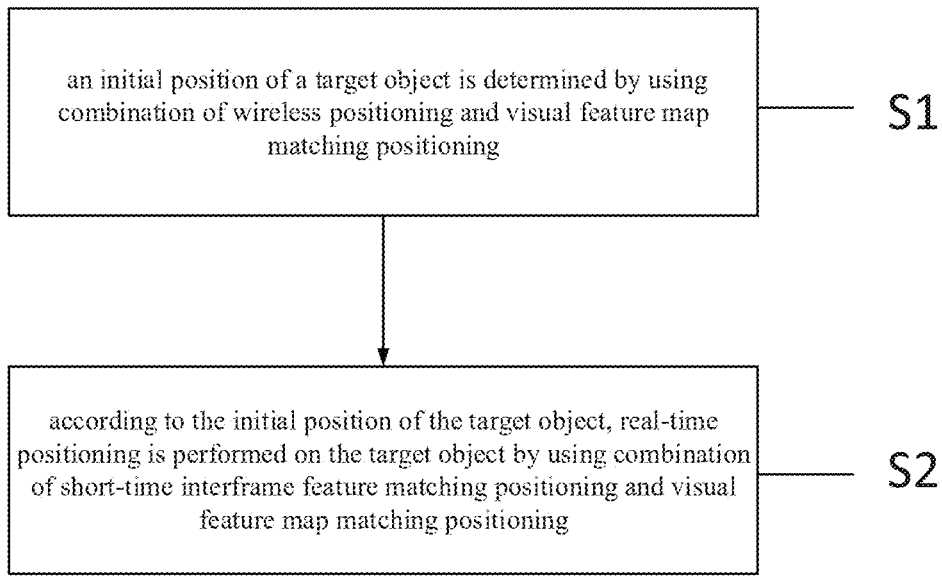
FIG. 1 is a flow chart of an indoor positioning method according to an embodiment of the present disclosure.

FIG. 1 is a flow chart of an indoor positioning method according to an embodiment of the present disclosure, the indoor positioning method of the present embodiment, in general, may include steps S1 and S2.

At step S1, an initial position of a target object is determined by using combination of wireless positioning and visual feature map matching positioning. The wireless positioning is a technology in which a wireless technology is used for positioning, and the visual feature map matching positioning is a technology in which a visual technology is used to extract visual features and performing positioning by feature matching based on the extracted visual features.

Specifically, the wireless positioning may be Bluetooth positioning, RFID positioning, WiFi positioning and the like, the present embodiment will take Bluetooth positioning as an example for description. The target object may be an electronic device having Bluetooth and camera function carried by a user in an indoor environment, for example, a mobile phone, a tablet PC or a notebook and so on; the target object is used to run a Bluetooth positioning program, a visual positioning program of interframe matching and a data fusion program; the initial position of the target object refers to a position of the target object when the positioning starts after it enters the indoor environment.

For simplicity of description, step S1 (in which an initial position of a target object is determined by using combination of wireless positioning and visual feature map matching positioning) is referred to as positioning initialization stage.

At step S2, according to the initial position of the target object, real-time positioning is performed on the target object by using combination of short-time interframe feature matching positioning and visual feature map matching positioning.

For simplicity of description, step S2 (in which real-time positioning is performed, according to the initial position of the target object, on the target object using combination of short-time interframe feature matching positioning and visual feature map matching positioning) is referred to as online positioning stage.

Before performing the positioning initialization stage, the indoor positioning method according to an embodiment of the present disclosure further includes: constructing a visual feature map of the indoor environment where the target object is located. The visual feature map is constructed by means of a camera of the target object. Specifically, for the entire indoor environment where the target object is located, indoor environment image data is collected by the camera, during the collection, the camera needs to tilt by a certain angle obliquely upwards relative to a horizontal plane, in one embodiment of the present disclosure, the angle is 30° to 45°, in order to avoid collecting dynamic environment information of the surroundings; meanwhile, synchronous positioning and construction of sparse three-dimensional feature point map are performed based on ORB_SLAM (ORB_Simultaneous Localization And Mapping) algorithm (the ORB_SLAM algorithm is disclosed in "ORB-SLAM:A Versatile and Accurate Monocular SLAM System, in IEEE Transactionson Robotics, vol. 31, no. 5, pp. 1147-1163, October 2015"), and after the construction, key frames of image information and relevant parameters of 3D feature points of the map are saved into a server, as the constructed offline map data, to load and apply at backend server side, thereby the construction of the visual feature map is finished. Visual offline map coordinate system needs to be coregistered with coordinate system of wireless positioning system, to ensure the two positioning systems are under the same world coordinate system. The server is used to receive Bluetooth positioning data and photograph data transmitted back by the device of the target object, perform matching positioning with the offline map data, and return positioning coordinate values of the target object.

Figure 2:
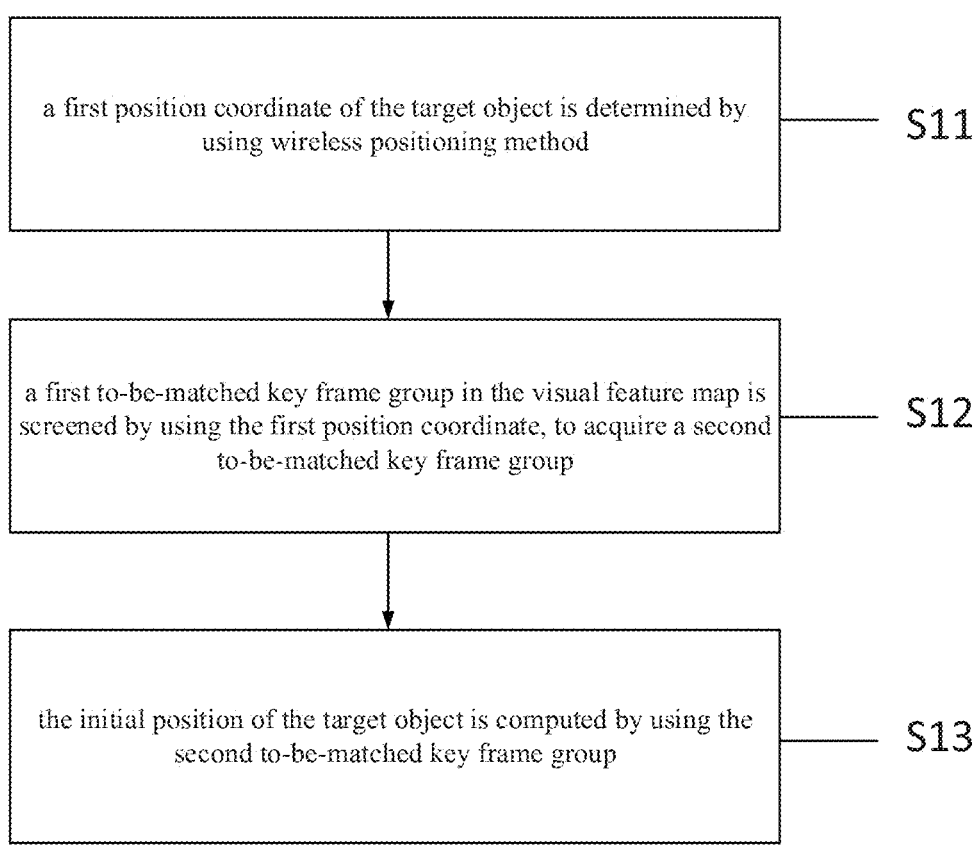
FIG. 2 is a flow chart of a positioning initialization stage of the indoor positioning method according to an embodiment of the present disclosure.

FIG. 2 is a flow chart of the positioning initialization stage of the indoor positioning method according to an embodiment of the present disclosure, and specifically, the positioning initialization stage includes steps S11 to S13.

At step S11, a first position coordinate of the target object is determined by using wireless (for example, Bluetooth) positioning method.

The target object is positioned by employing three-point weighted centroid algorithm, to obtain the first position coordinate of the target object. The wireless positioning may be Bluetooth positioning, RFD positioning, WiFi positioning and the like, the present embodiment will take Bluetooth positioning as an example for description. Specifically, Bluetooth beacon nodes may be disposed in the indoor environment, optionally, a Bluetooth beacon node is disposed every 3-5 m. Under a certain height, the target object receives Bluetooth signals, screens out top three beacons which have the strongest signal intensity or the closest distance to the target object, whose coordinates are $(x_1, y_1)$, $(x_2, y_2)$, $(x_3, y_3)$, respectively, distance values from the target object to the above three beacons are $d_1, d_2, d_3$, respectively, and the first position coordinate $(x_a, y_a)$ of the target object is found according to three-point weighted centroid algorithm:

$$x_a = \frac{\frac{x_1}{d_1} + \frac{x_2}{d_2} + \frac{x_3}{d_3}}{\frac{1}{d_1} + \frac{1}{d_2} + \frac{1}{d_3}}, y_a = \frac{\frac{y_1}{d_1} + \frac{y_2}{d_2} + \frac{y_3}{d_3}}{\frac{1}{d_1} + \frac{1}{d_2} + \frac{1}{d_3}}$$

The first position coordinate is sent to the server by wired connection or wireless connection.

At step S12: a first to-be-matched key frame group in the visual feature map is screened by using the first position coordinate, to acquire a second to-be-matched key frame group, wherein a range of the second to-be-matched key frame group is smaller than a range of the first to-be-matched key frame group;

Specifically, assuming $(x_i, y_i, z_i)$ is a position coordinate of the i-th to-be-matched key frame in the first to-be-matched key frame group, its transformation matrix is $T_{cwi}$ relative to the origin of the visual offline map coordinate system, and satisfies $(x_i, y_i, z_i)^T = T_{cwi}(x_0, y_0, z_0)^T$, wherein, it is assumed $(x_0, y_0, z_0)$ is the origin of the visual offline map coordinate system, $(x_a, y_a)$ is the first position coordinate of the target object, $\Delta d$ is maximum position error of Bluetooth positioning, if a to-be-matched key frame satisfies the following relationships at the same time $$x_a - \Delta d \leq x_i \leq x_a + \Delta d$$

$$y_a - \Delta d \leq y_i \leq y_a + \Delta d$$

Then, this to-be-matched key frame is considered to fall within a credible range, and this to-be-matched key frame is retained; otherwise, this to-be-matched key frame is discarded, and in the end a set of all the retained to-be-matched key frames is treated as the second to-be-matched key frame group. The range of the second to-be-matched key frame group is smaller than the range of the first to-be-matched key frame group, that is, the number of to-be-matched key frames in the second to-be-matched key frame group is smaller than the number of to-be-matched key frames in the first to-be-matched key frame group. Note that, in the embodiment of the present application, it is only necessary that coordinates x and y of the to-be-matched key frame satisfy the above relationships, because it is coordinates on a plane under a certain height that is determined in the wireless positioning stage, that is, z is a certain fixed value.

Before step S12, the method further includes acquiring the first to-be-matched key frame group.

Specifically, first, ORB (Oriented FAST and Rotated BRIEF) feature extraction is performed on the offline map data and an image (which is obtained by collecting a current position of the target object in real time by a camera of the apparatus of the target object) of the target object sent to the server via wired connection or wireless connection, to acquire corresponding visual words; then, the offline map is searched, to find out, as candidate frames, all key frames which have a common visual word with a current frame of the image of the target object and are not connected to the current frame, thereby constituting the first to-be-matched key frame group.

Figure 3:
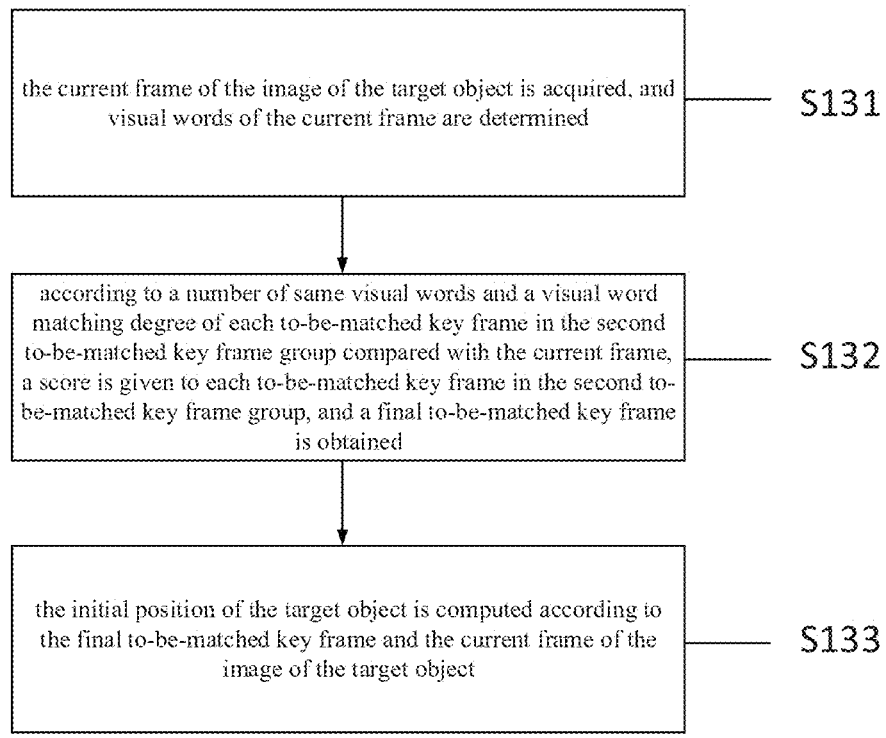
FIG. 3 is a flow chart of step S13 in the indoor positioning method according to an embodiment of the present disclosure.

At step S13, the initial position of the target object is computed by using the second to-be-matched key frame group. Specific process flow of step S13 described in FIG. 2 will be described below with reference to FIG. 3. FIG. 3 is a flow chart of step S13 in the indoor positioning method according to an embodiment of the present disclosure.

Specifically, the step of the computing the initial position of the target object using the second to-be-matched key frame group includes steps S131 to S133.

At step S131, the current frame of the image of the target object is acquired, and visual words of the current frame are determined;

At step S132, according to a number of same visual words and a visual word matching degree of each to-be-matched key frame in the second to-be-matched key frame group compared with the current frame, a score is given to each to-be-matched key frame in the second to-be-matched key frame group, and a final to-be-matched key frame is obtained.

Specifically, the number of same words is counted, indicating how many same visual words as the current frame each to-be-matched key frame in the second to-be-matched key frame group has, and then, among the to-be-matched key frames, those to-be-matched key frames, whose number of same words, indicating the number of visual words same as those in the current frame, is greater than a first threshold, and whose word matching degree is greater than a second threshold, are selected as common view frames; each common view frame gathers top ten frames having the highest degree of common view with itself (that is, the number of same words indicating the number of same visual words is the greatest, and word matching degree is great) into a group, and calculates an accumulative score; finally, the to-be-matched key frame having the highest score is selected out, as the final to-be-matched key frame.

It is to be noted that the above is merely one scoring method combining the number of same visual words and the visual word matching degree, but embodiments of the present disclosure is not limited thereto. In other embodiments of the present disclosure, scores may be given solely according to the number of same visual words to obtain the final to-be-matched key frame, or scores may be given solely according to the visual word matching degree, to obtain the final to-be-matched key frame.

At step S133, the initial position of the target object is computed according to the final to-be-matched key frame and the current frame of the image of the target object.

Specifically, iterative attitude estimation based on EPnP algorithm is performed on the current frame of the target object and the final to-be-matched key frame, finally a coordinate transformation matrix of the current frame relative to the origin of the visual offline map coordinate system is found, thereby computing a coordinate of the current frame of the target object, namely, determining the initial position of the target object, finishing the positioning initialization stage. Wherein EPnP algorithm is mainly used in ORB-SLAM to rapidly establish an initial attitude of the current camera. Also, the iterative attitude estimation based on EPnP algorithm is performed at device end.

In the positioning initialization stage, the target object is roughly positioned using wireless positioning technique, to obtain the first position coordinate of the target object, and to-be-matched key frames in the first to-be-matched key frame group in the visual feature map are screened using the first position coordinate, which substantially narrows the range of to-be-matched key frames, reduces the amount of computation, and improves the speed of finding the initial position of the target object; at the same time, mismatching in the visual positioning under high similarity environment is effectively prevented.

Figure 4:
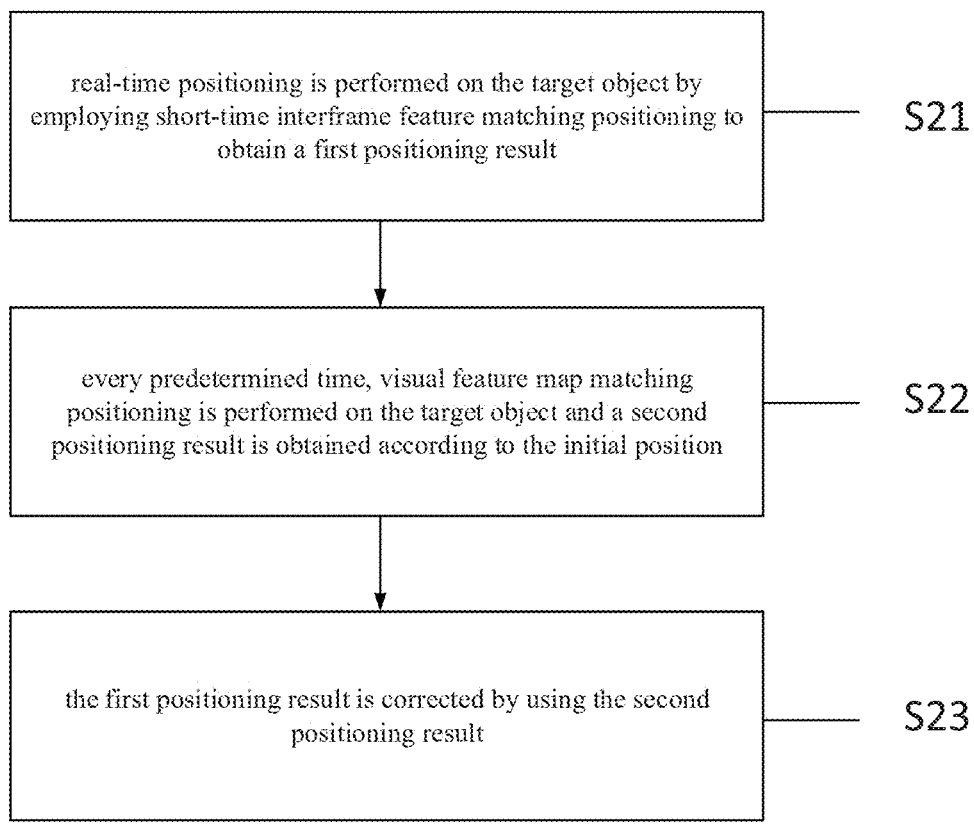
FIG. 4 is a flow chart of step S2 in the indoor positioning method according to an embodiment of the present disclosure.

Specific process flow of the online positioning stage described in FIG. 1 will be described below with reference to FIG. 4. FIG. 4 is a flow chart of the online positioning stage in the indoor positioning method according to an embodiment of the present disclosure.

As shown in FIG. 4, the online positioning stage includes steps S21 to S23.

At step S21, real-time positioning is performed on the target object by employing short-time interframe feature matching positioning to obtain a first positioning result.

Specifically, an image of a current position of the target object is collected in real time by the camera of the apparatus of the target object, a current frame of the target object is obtained according to the image of the current position, online positioning is performed on the target object using interframe feature matching in combination with a position coordinate of the target object corresponding to the previous frame, and the first positioning result is obtained, wherein, at the initial moment of the online positioning stage, the position of the target object corresponding to the previous frame is the initial position of the target object obtained in the positioning initialization stage. And at the next moment, the position of the target object corresponding to the previous frame is equivalent to the corrected first positioning result obtained by computation at the previous moment.

At step S22, every predetermined time, visual feature map matching positioning is performed on the target object and a second positioning result is obtained according to the initial position.

Specifically, when entering the online positioning stage, a timer is started, if the value of the timer reaches the predetermined time, then the operation of performing the visual feature map matching positioning on the target object and obtaining the second positioning result is triggered, and the timer is reset to zero, the above process is repeated, to realize "every predetermined time, visual feature map matching positioning is performed on the target object, and the second positioning result is obtained". The predetermined time takes a value of 10-50 s, and optionally, takes a value of 20 s or 30 s.

At step S23, the first positioning result is corrected by using the second positioning result.

Specifically, by using extended Kalman filter algorithm, data fusion is performed on the two positioning results, wherein, the first positioning result is treated as a state priori estimator, the second positioning result as a state observation value, obtaining the corrected first positioning result, to eliminate accumulative error in the online positioning stage short-time interframe feature matching positioning.

It is to be noted that, performing real-time positioning on the target object by employing short-time interframe feature matching positioning, obtaining the first positioning result, is a continuous dynamic process; and every predetermined time, performing visual feature map matching positioning on the target object, obtaining the second positioning result, is also a continuous dynamic process, but it needs to be performed once every predetermined time; the above two steps are performed simultaneously, when the predetermined time passes, visual feature map matching positioning is performed on the target object, obtaining the second positioning result, and the first positioning result of the current moment is corrected using the second positioning result, to eliminate accumulative error of the current first positioning result; positioning of the target object by short-time interframe feature matching at the next moment, is then to compute target object position value of the current moment according to the first positioning result corrected at the previous moment. In other words, the first positioning result at the initial moment in the online positioning stage is obtained by computation according to the initial position of the target object (that is, the initial position of the target object obtained in the positioning initialization stage) And at the next moment, position coordinate of the target object corresponding to the previous frame is equivalent to the corrected first positioning result obtained by computation at the previous moment, thereby finding feature of the current frame. This online positioning stage is repeated in this manner, until the end of the positioning. Thus, accumulative error can be eliminated, improving accuracy of real-time positioning. Furthermore, step reference numbers in the present disclosure do not define order of the steps. In other embodiments of the present disclosure, the steps illustrated in the present disclosure may be performed in reverse order or in parallel.

Figure 5:
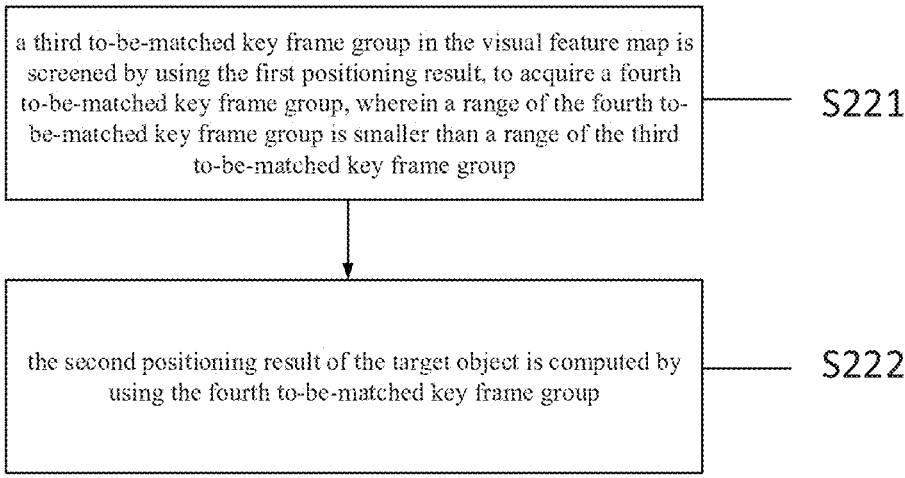
FIG. 5 is a flow chart of step S22 in the indoor positioning method according to an embodiment of the present disclosure.

Specific process flow of the step S22 described in FIG. 4 will be described below with reference to FIG. 5. FIG. 5 is a flow chart of the step S22 in the indoor positioning method according to an embodiment of the present disclosure. Specifically, referring to FIG. 5, the step of, every predetermined time, performing visual feature map matching positioning on the target object, and obtaining the second positioning result, includes steps S221 to S222.

At step S221, a third to-be-matched key frame group in the visual feature map is screened by using the first positioning result, to acquire a fourth to-be-matched key frame group, wherein a range of the fourth to-be-matched key frame group is smaller than a range of the third to-be-matched key frame group.

Specifically, assuming $(x_j, y_j, z_j)$ is a position coordinate of the j-th to-be-matched key frame in the third to-be-matched key frame group, the coordinate of the first positioning result is $(x_b, y_b)$, $\delta$ is an accumulative error threshold of interframe feature matching positioning within the predetermined time, if this to-be-matched key frame satisfies the following relationships at the same time:

$$x_b - \delta \leq x_j \leq x_b + \delta$$

$$y_b - \delta \leq y_j \leq y_b + \delta$$

Then, this to-be-matched key frame is considered to fall within a credible range, and this to-be-matched key frame is retained; otherwise, this to-be-matched key frame is discarded, and in the end a set of all the retained to-be-matched key frames is treated as the fourth to-be-matched key frame group. Note that, in the embodiment of the present application, it is only necessary that coordinates x and y of the to-be-matched key frame satisfy the above relationships, because it is coordinates on a plane under a certain height that is determined in the wireless positioning stage, that is, z is a certain fixed value. The range of the fourth to-be-matched key frame group is smaller than the range of the third to-be-matched key frame group.

Before step S221, the method further includes acquiring the third to-be-matched key frame group.

Specifically, first, ORB feature extraction is performed on the offline map data and an image of the target object, to acquire corresponding visual words; then, the offline map is searched, to find out, as candidate frames, all key frames which have a common visual word with a current frame of the image of the target object and are not connected to the current frame, thereby constituting the third to-be-matched key frame group.

At step S222, the second positioning result of the target object is computed by using the fourth to-be-matched key frame group.

Figure 6:
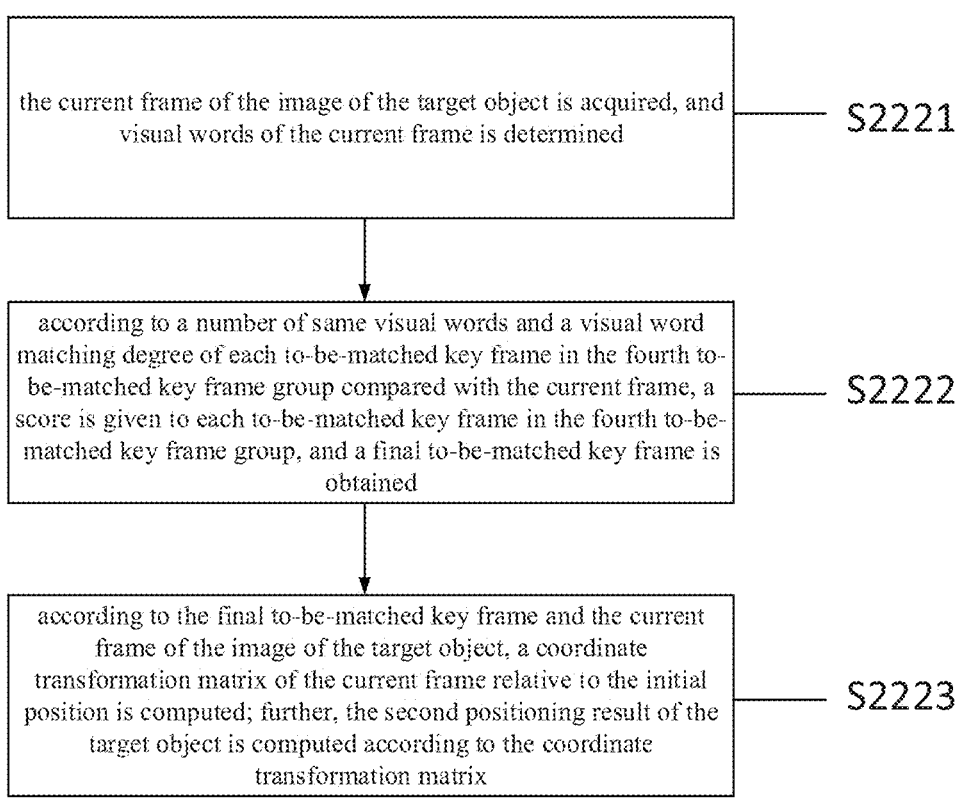
FIG. 6 is a flow chart of step S222 in the indoor positioning method according to an embodiment of the present disclosure.

Specific process flow of the step S222 described in FIG. 5 will be described below with reference to FIG. 6. FIG. 6 is a flow chart of the step S222 in the indoor positioning method according to an embodiment of the present disclosure.

Specifically, referring to FIG. 6, the step of computing the second positioning result of the target object using the fourth to-be-matched key frame group includes steps S2221 to S2223.

At step S2221, the current frame of the image of the target object is acquired, and visual words of the current frame is determined.

At step S2222, according to a number of same visual words and a visual word matching degree of each to-be-matched key frame in the fourth to-be-matched key frame group compared with the current frame, a score is given to each to-be-matched key frame in the fourth to-be-matched key frame group, and a final to-be-matched key frame is obtained.

Specifically, the number of same words is counted, indicating how many same visual words as the current frame each to-be-matched key frame in the fourth to-be-matched key frame group has, and then, from among the to-be-matched key frames, those to-be-matched key frames whose number of same words, indicating the number of visual words same as those of the current frame, is greater than a first threshold, and whose word matching degree is greater than a second threshold, are selected as common view frames; each common view frame gathers top ten frames having the highest degree of common view with itself (that is, the number of words indicating the number of same visual words is the greatest, and word matching degree is great) into a group, and calculates an accumulative score; finally, the to-be-matched key frame having the highest group score is selected out, as the final to-be-matched key frame.

It is to be noted that the above is merely one scoring method combining the number of same visual words and the visual word matching degree, but embodiments of the present disclosure is not limited thereto. In other embodiments of the present disclosure, scores may be given solely according to the number of same visual words to obtain the final to-be-matched key frame, or scores may be given solely according to the visual word matching degree, to obtain the final to-be-matched key frame.

At step S2223, according to the final to-be-matched key frame and the current frame of the image of the target object, a coordinate transformation matrix of the current frame relative to the initial position is computed; further, the second positioning result of the target object is computed according to the coordinate transformation matrix.

Specifically, iterative attitude estimation based on EPnP algorithm is performed on the current frame of the target object and the final to-be-matched key frame, to find coordinate transformation matrix $T_{cw}$ of the current frame relative to the initial position of the target object, thereby computing coordinate of the current frame of the target object according to the coordinate transformation matrix, then obtaining the second positioning result of the target object.

And steps of the online positioning stage are repeated, until the end of the positioning. The technical means of eliminating accumulative positioning error by employing short-time visual online interframe matching positioning, timing and offline map data matching, effectively reduces data computation amount of online positioning of the device of the target object, and can obtain high indoor positioning accuracy.

It is to be noted that, the core idea of the short-time interframe feature matching positioning is to compute and obtain position coordinate of the current frame, that is, the first position result, via difference between feature of the current frame and feature of the previous frame, and in combination with position coordinate of the target object corresponding to the previous frame. Herein, the first positioning result at the initial moment in the online positioning stage is obtained by computation according to the initial position of the target object (that is, the initial position of the target object obtained in the positioning initialization stage).

And at the next moment, position coordinate of the target object corresponding to the previous frame is equivalent to the corrected first positioning result obtained by computation at the previous moment, thereby finding feature of the current frame. This online positioning stage is repeated in this manner, until the end of the positioning. Thus, when online positioning is performed for a while by short-time interframe feature matching positioning, the obtained first positioning result may have a relatively large accumulative error, decreasing the accuracy of real-time positioning result. Therefore, it is necessary to perform visual feature map matching positioning on the target object every predetermined time, obtain the second positioning result, and correct the current first positioning result using the second positioning result, to eliminate accumulative error, and obtain the corrected positioning result, thereby improving the accuracy of the online positioning result.

In the present disclosure, by fusing Bluetooth positioning technique into visual positioning method, the range of to-be-matched key frames in the visual feature map is substantially narrowed down using Bluetooth positioning result, which reduces the amount of computation in feature matching, and improves the speed of finding the initial position; at the same time, mismatching in the visual positioning under high similarity environment is effectively prevented.

On the other hand, short-time interframe feature matching positioning is employed, and every predetermined time, visual feature map matching positioning is performed, and accumulative error of short-time interframe feature matching positioning is eliminated using the positioning result of visual feature map matching positioning, which can obtain a relatively high indoor positioning accuracy.

Figure 7:
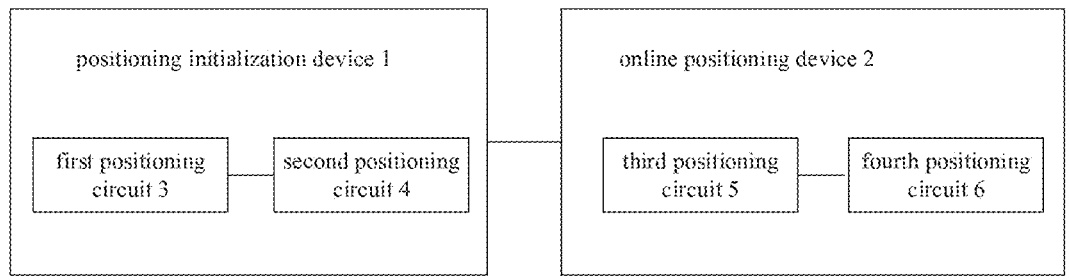
FIG. 7 is a block diagram of an indoor positioning system according to an embodiment of the present disclosure.

FIG. 7 is a block diagram of an indoor positioning system according to an embodiment of the present disclosure.

Referring to FIG. 7, an embodiment of the present disclosure provides an indoor positioning system 700, including a positioning initialization device 1 and an online positioning device 2, wherein, The positioning initialization device 1 is configured to determine an initial position of a target object using combination of wireless positioning and visual feature map matching positioning;

Wherein, the wireless positioning may be Bluetooth positioning, RFID positioning, WiFi positioning and the like, the present embodiment will take Bluetooth positioning as an example for description. The target object may be an electronic device having Bluetooth and camera function carried by a user in an indoor environment, for example, a mobile phone, a tablet PC or a notebook and so on; the target object is used to run a Bluetooth positioning program, a visual positioning program of interframe matching and a data fusion program; the initial position of the target object refers to a position of the target object when the positioning starts after it enters the indoor environment.

The online positioning device 2 is configured to, after success of the positioning initialization, perform, according to the initial position of the target object, real-time positioning on the target object using combination of short-time interframe feature matching positioning and visual feature map matching positioning.

In one embodiment of the present disclosure, the positioning initialization device 1 includes a first positioning circuit 3 and a second positioning circuit 4;

The first positioning circuit 3 is configured to determine a first position coordinate of the target object using wireless (for example, Bluetooth) positioning method; in practical applications, indoor space may be disposed with Bluetooth beacon nodes, optionally, a Bluetooth beacon node may be disposed every 3-5 meters.

The second positioning circuit 4 is configured to: screen a first to-be-matched key frame group in the visual feature map using the first position coordinate, to acquire a second to-be-matched key frame group, wherein a range of the second to-be-matched key frame group is smaller than a range of the first to-be-matched key frame group; and compute the initial position of the target object using the second to-be-matched key frame group.

In one embodiment of the present disclosure, the online positioning device 2 includes a third positioning circuit 5 and a fourth positioning circuit 6.

The third positioning circuit 5 is configured to perform real-time positioning on the target object by employing short-time interframe feature matching positioning, and obtain a first positioning result.

The fourth positioning circuit 6 is configured to perform, every predetermined time, visual feature map matching positioning on the target object, and obtain a second positioning result according to the initial position, and correct the first positioning result using the second positioning result.

Figure 8:
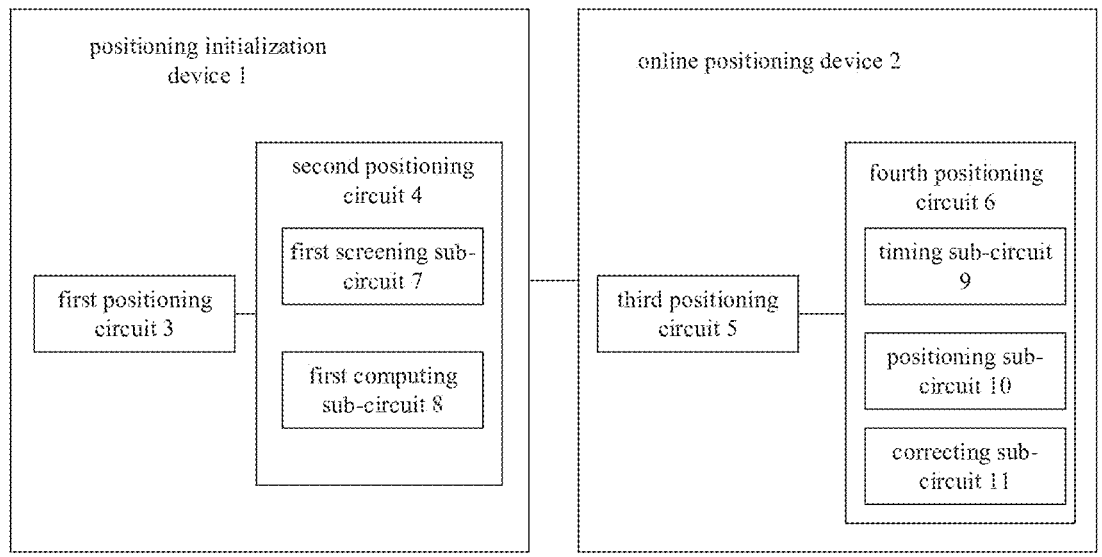
FIG. 8 is another block diagram of an indoor positioning system according to an embodiment of the present disclosure.

FIG. 8 is another block diagram of an indoor positioning system 800 according to an embodiment of the present disclosure. Referring to FIG. 8, the second positioning circuit 4 further includes a first screening sub-circuit 7 and a first computing sub-circuit 8.

The first screening sub-circuit 7 is configured to determine whether a position coordinate of an i-th to-be-matched key frame in the first to-be-matched key frame group satisfies the following relationships:

$$x_a - \Delta d \leq x_i \leq x_a + \Delta d$$

$$y_a - \Delta d \leq y_i \leq y_a + \Delta d$$

Where, $(x_i, y_i, z_i)$ is the position coordinate of the i-th to-be-matched key frame in the first to-be-matched key frame group, its transformation matrix is $T_{cwi}$ relative to the origin of the visual offline map coordinate system, and satisfies $(x_i, y_i, z_i)^T = T_{cwi}(x_0, y_0, z_0)^T$, where, it is assumed $(x_0, y_0, z_0)$ is the origin of the visual offline map coordinate system, $(x_a, y_a)$ is the first position coordinate of the target object, $\Delta d$ is maximum position error of Bluetooth positioning;

If the relationships are satisfied, then the to-be-matched key frame is retained; if the relationships are not satisfied, then the to-be-matched key frame is discarded; a set of the retained to-be-matched key frames is the second to-be-matched key frame group.

The first computing sub-circuit 8 is configured to compute the initial position of the target object using the second to-be-matched key frame group.

In one embodiment of the present disclosure, the fourth positioning circuit 6 includes:

a positioning sub-circuit 10, configured to: screen a third to-be-matched key frame group in the visual feature map using the first positioning result, to acquire a fourth to-be-matched key frame group, wherein a range of the fourth to-be-matched key frame group is smaller than a range of the third to-be-matched key frame group; and compute the second positioning result of the target object using the fourth to-be-matched key frame group and according to the initial position;

a timing sub-circuit 9, configured to trigger, every predetermined time, the operation of the positioning sub-circuit, where the timing sub-circuit 9 may be implemented by a timer;

a correcting sub-circuit 11, configured to correct the first positioning result using the second positioning result.

In one embodiment of the present disclosure, the positioning sub-circuit 10 includes a second screening sub-circuit and a second computing sub-circuit.

The second screening sub-circuit is configured to determine whether a to-be-matched key frame in the third to-be-matched key frame group satisfies the following relationships:

$$x_b - \delta \leq x_j \leq x_b + \delta$$

$$y_b - \delta \leq y_j \leq y_b + \delta$$

Where, $(x_j, y_j, z_j)$ is a position coordinate of the j-th to-be-matched key frame in the third to-be-matched key frame group, the coordinate of the first positioning result is $(x_b, y_b)$, $\delta$ is an accumulative error threshold of interframe feature matching positioning within the predetermined time;

If the relationships are satisfied, then the to-be-matched key frame is retained; if the relationships are not satisfied, then the to-be-matched key frame is discarded; a set of the retained to-be-matched key frames is the fourth to-be-matched key frame group.

The second computing sub-circuit is configured to compute the second positioning result of the target object using the fourth to-be-matched key frame group and according to the initial position.

In one embodiment of the present disclosure, the correcting sub-circuit 11 is configured to perform data fusion on the two positioning results, using extended Kalman filter algorithm, wherein, the first positioning result is treated as a state priori estimator, the second positioning result as a state observation value, obtaining the corrected first positioning result, to eliminate accumulative error of short-time interframe feature matching positioning in the online positioning stage.

It is to be noted that, since the first positioning circuit 3 and the third positioning circuit 5 have low amount of computation, optionally, the first positioning circuit 3 and the third positioning circuit 5 may be integrated at a user device end, and since the second positioning circuit 4 and the positioning sub-circuit 10 have relatively large amount of computation, optionally, the second positioning circuit 4, the positioning sub-circuit 10, the timing sub-circuit 9 and the correcting sub-circuit 11 may be integrated at a server end, the user device may communicate with the server via wired connection or wireless connection, thereby reducing communication frequency of the user device and the server. The above is merely one configuration, but is not limited thereto, all of them may be placed at the server end, but the communication frequency of the user device and the server may be higher in this configuration.

Figure 9:
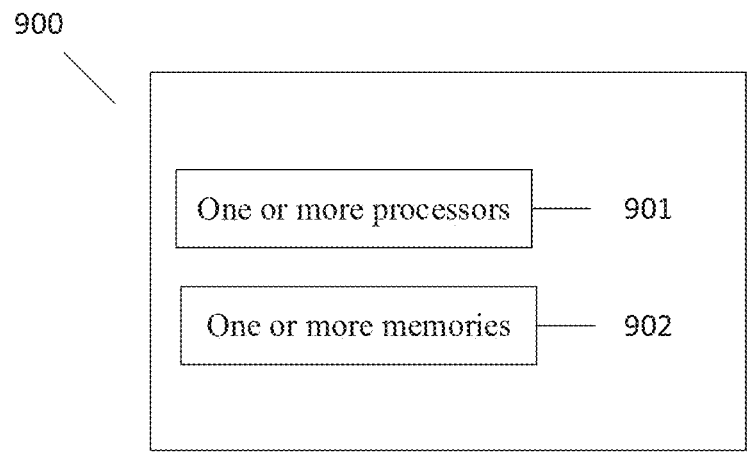
FIG. 9 is an exemplarily block diagram of an apparatus including the above-described indoor positioning system according to an embodiment of the present disclosure.

FIG. 9 is an exemplarily block diagram of an indoor positioning apparatus according to an embodiment of the present disclosure.

In another aspect, an embodiment of the present disclosure provides an indoor positioning apparatus 900, including: one or more processors 901; one or more memories 902, wherein the one or more memories store computer executable instructions, the executable instructions, when run by the one or more processors, perform the above indoor positioning method.

In yet another aspect an embodiment of the present disclosure provides a computer readable medium, stored with computer executable instructions, and the executable instructions, when run by a processor, performs the above indoor positioning method.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. An indoor positioning method, comprising steps of:
determining an initial position of a target object using combination of wireless positioning and visual feature map matching positioning; and
according to the initial position of the target object, performing real-time positioning on the target object using combination of short-time interframe feature matching positioning and the visual feature map matching positioning,
wherein the step of determining the initial position of the target object using combination of wireless positioning and visual feature map matching positioning comprises steps of:
determining a first position coordinate of the target object using a wireless positioning method;
screening a first to-be-matched key frame group in a visual feature map of an indoor environment using the first position coordinate, to acquire a second to-be-matched key frame group; and
computing the initial position of the target object using the second to-be-matched key frame group,
wherein, the first to-be-matched key frame group is obtained by: acquiring the visual feature map and visual words of a current frame of an image of the target object; and searching the visual feature map, to find out all key frames which have a common visual word with the current frame of the image of the target object and are not connected to the current frame.

2. The indoor positioning method according to claim 1, wherein the step of, according to the initial position of the target object, performing real-time positioning on the target object using combination of short-time interframe feature matching positioning and the visual feature map matching positioning, comprises steps of:
performing real-time positioning on the target object by employing short-time interframe feature matching positioning to obtain a first positioning result;
every predetermined time, performing visual feature map matching positioning on the target object, and obtaining a second positioning result according to the initial position; and
correcting the first positioning result using the second positioning result.

3. The indoor positioning method according to claim 2, wherein the step of, every predetermined time, performing visual feature map matching positioning on the target object, and obtaining the second positioning result according to the initial position, comprises steps of:
screening a third to-be-matched key frame group in a visual feature map using the first positioning result, to acquire a fourth to-be-matched key frame group; and computing the second positioning result of the target object using the fourth to-be-matched key frame group and according to the initial position, wherein, the third to-be-matched key frame group is obtained by: acquiring the visual feature map of an indoor environment and visual words of a current frame of an image of the target object; and searching the visual feature map, to find out all key frames which have a common visual word with the current frame of the image of the target object and are not connected to the current frame.

4. The indoor positioning method according to claim 3, wherein the step of screening the third to-be-matched key frame group in the visual feature map using the first positioning result, to acquire the fourth to-be-matched key frame group, comprises steps of:

determining whether a to-be-matched key frame in the third to-be-matched key frame group satisfies the following relationships:

$$x_b - \delta \leq x_j \leq x_b + \delta$$

$$y_b - \delta \leq y_j \leq y_b + \delta$$

wherein, $(x_j, y_j, z_j)$ is a position coordinate of a j-th to-be-matched key frame in the third to-be-matched key frame group, a coordinate of the first positioning result is $(x_b, y_b)$, $\delta$ is an accumulative error threshold of interframe feature matching positioning within the predetermined time;

in a case where the relationships are satisfied, the to-be-matched key frame is retained; in a case where the relationships are not satisfied, the to-be-matched key frame is discarded; a set of retained to-be-matched key frames is the fourth to-be-matched key frame group.

5. The indoor positioning method according to claim 3, wherein the step of computing the second positioning result of the target object using the fourth to-be-matched key frame group and according to the initial position comprises steps of:

acquiring the current frame of the image of the target object and determining visual words of the current frame;

according to at least one of a number of same visual words and a visual word matching degree of each to-be-matched key frame in the fourth to-be-matched key frame group compared with the current frame, giving a score to each to-be-matched key frame in the fourth to-be-matched key frame group;

according to a to-be-matched key frame having a highest score and the current frame of the image of the target object, computing a coordinate transformation matrix of the current frame relative to the initial position;

computing the second positioning result of the target object according to the coordinate transformation matrix.

6. The indoor positioning method according to claim 2, wherein the step of correcting the first positioning result using the second positioning result comprises step of:

obtaining a corrected first positioning result by using extended Kalman filter algorithm to perform data fusion on the first positioning result and the second positioning result, wherein, the first positioning result is treated as a state priori estimator, the second positioning result is treated as a state observation value.

7. The indoor positioning method according to claim 1, wherein the step of screening the first to-be-matched key frame group in the visual feature map using the first position coordinate, to acquire the second to-be-matched key frame group comprises steps of:

determining whether a to-be-matched key frame in the first to-be-matched key frame group satisfies the following relationships:

$$x_a - \Delta d \leq x_i \leq x_a + \Delta d$$

$$y_a - \Delta d \leq y_i \leq y_a + \Delta d$$

where, $(x_i, y_i, z_i)$ is a position coordinate of an i-th to-be-matched key frame in the first to-be-matched key frame group, $(x_a, y_a)$ is the first position coordinate of the target object, $\Delta d$ is a maximum position error of wireless positioning;

in a case where the relationships are satisfied, the to-be-matched key frame is retained; in a case where the relationships are not satisfied, the to-be-matched key frame is discarded; a set of retained to-be-matched key frames is the second to-be-matched key frame group.

8. The indoor positioning method according to claim 1, wherein the step of computing the initial position of the target object using the second to-be-matched key frame group comprises steps of:

acquiring the current frame of the image of the target object and determining visual words of the current frame;

according to at least one of a number of same visual words and a visual word matching degree of each to-be-matched key frame in the second to-be-matched key frame group compared with the current frame, giving a score to each to-be-matched key frame in the second to-be-matched key frame group;

computing the initial position of the target object, according to a to-be-matched key frame having a highest score and the current frame of the image of the target object.

9. The indoor positioning method according to claim 1, further comprising: constructing a visual feature map of an indoor environment where the target object is located.

10. An indoor positioning apparatus, comprising:
one or more processors; and
one or more memories,
wherein, the one or more memories store computer executable instructions, the computer executable instructions, when run by the one or more processors, perform the indoor positioning method according to claim 1.

11. A non-transitory computer readable storage medium, stored with computer executable instructions, wherein the computer executable instructions, when run by a processor, perform the indoor positioning method according to claim 1.

12. The non-transitory computer readable storage medium according to claim 11, wherein the step of, according to the initial position of the target object, performing real-time positioning on the target object using combination of short-time interframe feature matching positioning and the visual feature map matching positioning, comprises steps of:

performing real-time positioning on the target object by employing short-time interframe feature matching positioning to obtain a first positioning result;

every predetermined time, performing visual feature map matching positioning on the target object, and obtaining a second positioning result according to the initial position; and correcting the first positioning result using the second positioning result.

13. The non-transitory computer readable storage medium according to claim 12, wherein the step of, every predetermined time, performing visual feature map matching positioning on the target object, and obtaining the second positioning result according to the initial position, comprises steps of:
  screening a third to-be-matched key frame group in a visual feature map using the first positioning result, to acquire a fourth to-be-matched key frame group; and
  computing the second positioning result of the target object using the fourth to-be-matched key frame group and according to the initial position,
  wherein, the third to-be-matched key frame group is obtained by: acquiring the visual feature map of an indoor environment and visual words of a current frame of an image of the target object; and searching the visual feature map, to find out all key frames which have a common visual word with the current frame of the image of the target object and are not connected to the current frame.

14. The non-transitory computer readable storage medium according to claim 13, wherein the step of screening the third to-be-matched key frame group in the visual feature map using the first positioning result, to acquire the fourth to-be-matched key frame group, comprises steps of:
  determining whether a to-be-matched key frame in the third to-be-matched key frame group satisfies the following relationships:

$x_b - \delta \le x_j \le x_b + \delta$ $y_b - \delta \le y_j \le y_b + \delta$ wherein, $(x_j, y_j, z_j)$ is a position coordinate of a j-th to-be-matched key frame in the third to-be-matched key frame group, a coordinate of the first positioning result is $(x_b, y_b)$, $\delta$ is an accumulative error threshold of interframe feature matching positioning within the predetermined time;
  in a case where the relationships are satisfied, the to-be-matched key frame is retained; in a case where the relationships are not satisfied, the to-be-matched key frame is discarded; a set of retained to-be-matched key frames is the fourth to-be-matched key frame group.

15. The non-transitory computer readable storage medium according to claim 13, wherein the step of computing the second positioning result of the target object using the fourth to-be-matched key frame group and according to the initial position comprises steps of:
  acquiring the current frame of the image of the target object and determining visual words of the current frame;
  according to at least one of a number of same visual words and a visual word matching degree of each to-be-matched key frame in the fourth to-be-matched key frame group compared with the current frame, giving a score to each to-be-matched key frame in the fourth to-be-matched key frame group;
  according to a to-be-matched key frame having a highest score and the current frame of the image of the target object, computing a coordinate transformation matrix of the current frame relative to the initial position;
  computing the second positioning result of the target object according to the coordinate transformation matrix.

16. The non-transitory computer readable storage medium according to claim 12, wherein the step of correcting the first positioning result using the second positioning result comprises step of:
  obtaining a corrected first positioning result by using extended Kalman filter algorithm to perform data fusion on the first positioning result and the second positioning result, wherein, the first positioning result is treated as a state priori estimator, the second positioning result is treated as a state observation value.

17. The non-transitory computer readable storage medium according to claim 11, wherein the step of screening the first to-be-matched key frame group in the visual feature map using the first position coordinate, to acquire the second to-be-matched key frame group comprises steps of:
  determining whether a to-be-matched key frame in the first to-be-matched key frame group satisfies the following relationships:

$x_a - \Delta d \le x_i \le x_a + \Delta d$ $y_a - \Delta d \le y_i \le y_a + \Delta d$ where, $(x_i, y_i, z_i)$ is a position coordinate of an i-th to-be-matched key frame in the first to-be-matched key frame group, $(x_a, y_a)$ is the first position coordinate of the target object, $\Delta d$ is a maximum position error of wireless positioning;
  in a case where the relationships are satisfied, the to-be-matched key frame is retained; in a case where the relationships are not satisfied, the to-be-matched key frame is discarded; a set of retained to-be-matched key frames is the second to-be-matched key frame group.

18. The non-transitory computer readable storage medium according to claim 11, wherein the step of computing the initial position of the target object using the second to-be-matched key frame group comprises steps of:
  acquiring the current frame of the image of the target object and determining visual words of the current frame;
  according to at least one of a number of same visual words and a visual word matching degree of each to-be-matched key frame in the second to-be-matched key frame group compared with the current frame, giving a score to each to-be-matched key frame in the second to-be-matched key frame group;
  computing the initial position of the target object, according to a to-be-matched key frame having a highest score and the current frame of the image of the target object.

* * * * *